June 7, 1955

J. V. LEBACQZ 2,710,351

PULSE GENERATOR

Filed April 16, 1946

INVENTOR
JEAN V. LEBACQZ

BY M. A. Hayes

ATTORNEY

United States Patent Office 2,710,351

Patented June 7, 1955

2,710,351

PULSE GENERATOR

Jean V. Lebacqz, Lexington, Mass., assignor, by mesne assignments, to the United States of America as represented by the Secretary of the Navy Application April 16, 1946, Serial No. 662,462

5 Claims. (Cl. 250—27)

This invention relates to pulse generators and pulse forming circuits and more particularly to circuits for obtaining multiple pulses utilizing line type modulators.

In the electronic art, the use of double and irregularly shaped pulses occurs quite frequently. In particular in identification radar systems, multiple pulses are used to code the responders to permit identification by friendly ships or planes. Several ways of accomplishing this have been developed, but they require elaborate and complicated equipment. Accordingly, it is the general object of this invention to provide a simple pulse forming circuit capable of providing multiple pulses.

Another object is to provide a pulse forming circuit for producing irregularly shaped pulses.

A further object is to provide a multiple pulse forming circuit which is lighter in weight, more compact, and cheaper to manufacture than those heretofore proposed and used.

Figure 1:
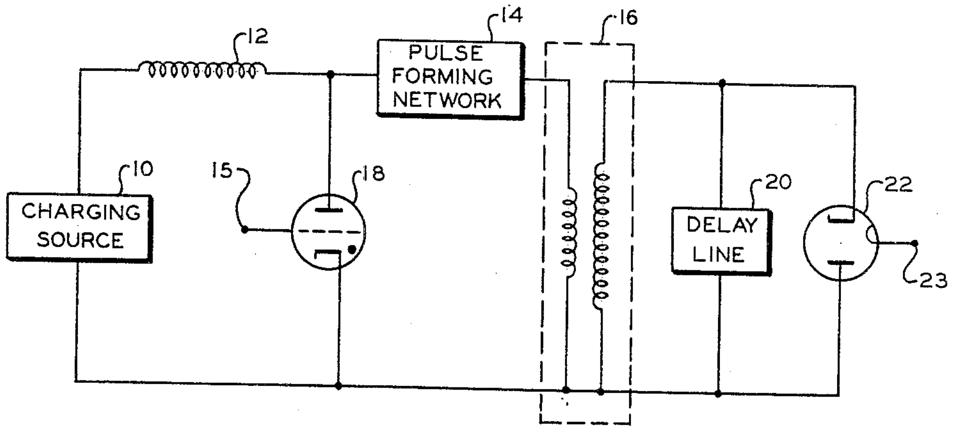
Figure 2:
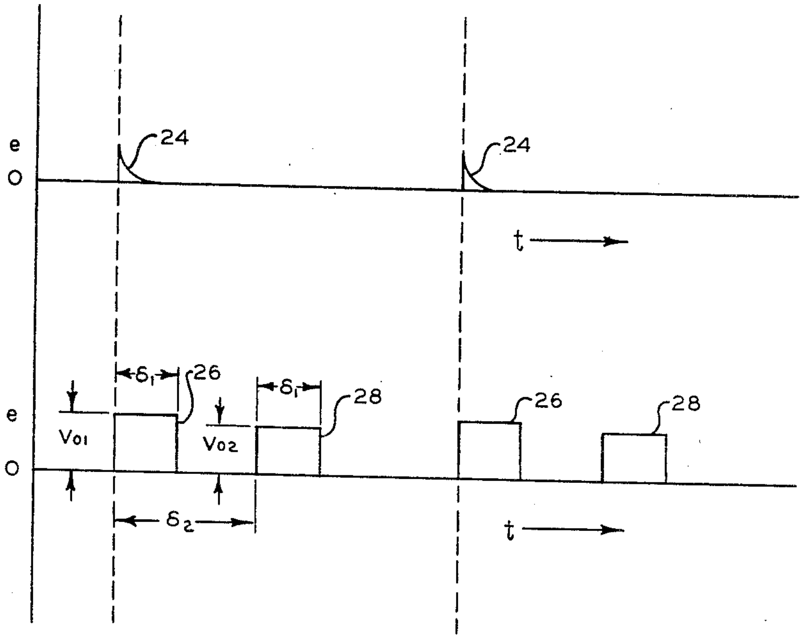

To accomplish the foregoing objects and more specific objects which hereinafter appear, this invention resides in the circuit elements and their relation one to another, as are more particularly described in the following specification. The specification is accompanied by drawings in which:

Fig. 1 is a schematic diagram of a radar modulator in which this invention is used; and Fig. 2 is a series of wave forms showing the development of pulses in the modulator of Fig. 1.

Referring to Figs. 1 and 2, a charging source 10, a charging impedance 12, a pulse forming network 14, and the primary winding of a pulse transformer 16, are connected in series. A thyratron 18, capable of being fired by a trigger pulse supplied from an external source on its grid terminal 15, is connected in parallel with the pulse forming network 14 and the primary winding of pulse transformer 16. Across the secondary winding of pulse transformer 16, a delay line 20 and a magnetron 22 are connected to provide R. F. output at terminal 23.

Assuming that the pulse forming network 14 is initially charged to a potential determined by the charging source 10 and characteristics of the charging impedance 12, a trigger pulse 24 (Fig. 2) applied to the grid terminal 15 of thyratron 18 will cause the thyratron to conduct. Because of the size of the charging impedance 12, with respect to the effective impedance of the pulse transformer 16, substantially all of the conduction will take place through the circuit composed of the pulse forming network 14, the primary of pulse transformer 16, and the thyratron 18. This conduction will continue for the length of time $\delta_1$ required for the pulse forming network 14 to discharge. When the pulse forming network 14 is discharged, the thyratron 18 will stop conducting and network 14 will start to recharge from charging source 10.

As a result of the conduction through the primary of transformer 16, a voltage pulse 26 of amplitude $V_{01}$ and duration $\delta_1$ seconds will be developed across the secondary of transformer 16 which will energize the delay line 20 and magnetron 22. After the length of time $\delta_2$ required for the voltage pulse 26 to travel down and reflect back from the open end of delay line 20, the magnetron will be energized by a second voltage pulse 28 of amplitude $V_{02}$ and duration $\delta_1$.

If $\delta_2$ is greater than $\delta_1$, the magnetron will effectively be energized by two pulses of the same duration, $\delta_1$, occurring $\delta_2$ seconds apart as measured from the beginning of each, and of amplitudes $V_{01}$ and $V_{02}$ expressed by the following equations.

$$V_{01}=nE_B\frac{Z_1R_L}{Z_0Z_1n^2+Z_0R_Ln^2+Z_1R_L} \qquad \text{(I)}$$

$$V_{02}=\alpha V_{01}\frac{2R_L}{R_L+Z_1} \qquad \text{(II)}$$

In the equations $n$ is the turns ratio of pulse transformer 16, $E_B$ is the potential of pulse forming network 14 when the trigger is applied at 15, $Z_0$ is the impedance of pulse forming network 14, $Z_1$ is the impedance of delay line 20, $R_L$ is the impedance of magnetron 22, and $\alpha$ is the total attenuation in delay line 20.

The sizes of $Z_0$ and $Z_1$ required for $V_{02}$ to equal $V_{01}$ can be determined from the relations III and IV below when the magnetron impedance $R_L$, the attenuation $\alpha$ and the turns ratio $n$ are known.

$$Z_0=\frac{R_L(2\alpha-1)}{2\alpha n^2} \qquad \text{(III)}$$

$$Z_1=R_L(2\alpha-1) \qquad \text{(IV)}$$

If $\delta_2$ is less than $\delta_1$, the magnetron will effectively be pulsed by one pulse of duration $\delta_1+\delta_2$ and of irregular amplitude. The pulse will have three distinct values of amplitude. The first part of the pulse will last $\delta_2$ seconds and will have an amplitude $V_{01}$. The second part will last for $\delta_1-\delta_2$ seconds and will have an amplitude equal to the sum of the two pulse amplitudes $V_{01}$ and $V_{02}$. The equation for $V_{02}$ however would be different from the one previously shown, since for this part of the pulse, the thyratron 18 would still be conducting. The third part of the pulse will last for $\delta_2$ seconds and would have an amplitude equal to $V_{02}$.

As can be seen from the foregoing specification, to obtain a double pulse or an irregular pulse in a line type modulator, it is only necessary to place a delay line of proper characteristics in parallel with the modulator load. Obviously this is a much simpler way of obtaining multiple pulses than methods which require multiple switch tubes, multiple pulse forming lines and multiple triggering circuits, and within certain limits imposed by the attenuation factors of delay lines, an appreciable saving in cost of construction, in space, and in weight can be realized by use of this invention.

The invention described in the foregoing specification need not be limited to the details shown, which are considered to be illustrative of one form the invention may take.

What is claimed is:

1. In a radar type modulator, a pulse forming network, a charging source for said pulse forming network, a charging impedance, a pulse transformer having at least a primary and a secondary winding, the primary winding of said pulse transformer being connected in series with said pulse forming network, said charging source and said charging impedance, means for shorting said pulse forming network across the primary winding of said pulse transformer in response to a trigger pulse applied thereto so as to produce a voltage pulse across the secondary winding of said pulse transformer, a transmitter connected across the secondary winding of said transformer, a delay line connected in parallel with said transmitter and the secondary of said transformer, said delay line having such delay and impedance characteristics with respect to the discharge and impedance characteristics of said pulse forming network to reflect a pulse and thereby cause said transmitter to be modulated by two successive voltage pulses.

2. The structure of claim 1 wherein said shorting means includes a thyratron operative in response to a trigger pulse applied thereto.

3. In a radar type modulator, a pulse forming network, a charging impedance, a charging source adapted to charge said network through said impedance, a pulse transformer having its input winding connected to said network and its output winding coupled to a load, a delay line connected in parallel with said load, and a switch for discharging said network through said input winding.

4. A pulse forming circuit for modulating a transmitter with composite pulses comprising, a pulse transformer, a pulse forming network connected to the primary winding of said transformer, means for charging said pulse forming network, switch means for discharging said network through the primary winding of said transformer, a transmitter connected to the secondary winding of said transformer, and a delay line connected across said transmitter.

5. In combination with a generator of pulses, a pulse transformer having its primary winding connected to said generator of pulses, a load, a variable delay line connected across said load, said load being connected in parallel relationship with the secondary winding of said transformer whereby pulses from said generator and pulses delayed in time by said delay line are applied to said load.

References Cited in the file of this patent

UNITED STATES PATENTS

| | | |
|---|---|---|
| 2,069,538 | Philpott | Feb. 2, 1937 |
| 2,412,974 | Deloraine | Dec. 24, 1946 |
| 2,415,093 | Gerwin | Feb. 4, 1947 |
| 2,422,086 | Evans | June 10, 1947 |
| 2,439,389 | Hussey | Apr. 13, 1948 |
| 2,457,559 | Huber | Dec. 28, 1948 |
| 2,617,883 | Anger | Nov. 11, 1952 |